Feb. 5, 1963  E. A. BRIDLE ETAL  3,076,633
TURBINE AND LIKE ROTOR BLADES
Filed April 19, 1956  2 Sheets-Sheet 1
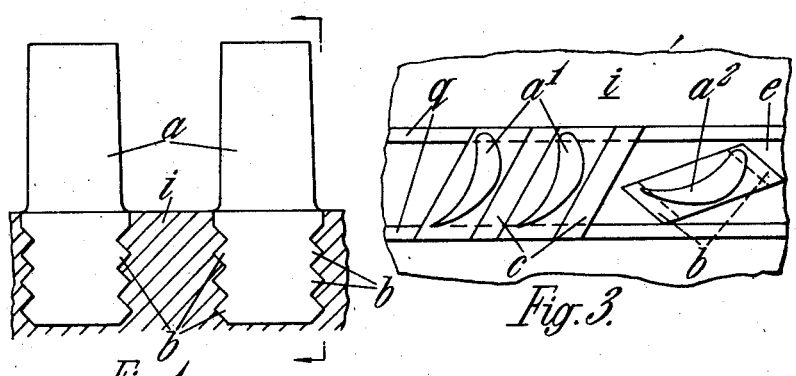
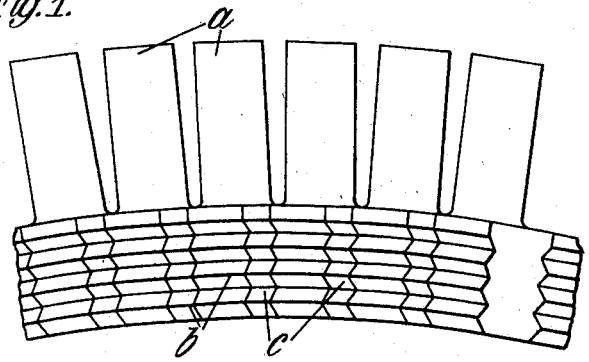
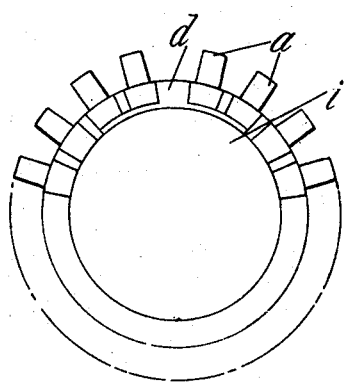
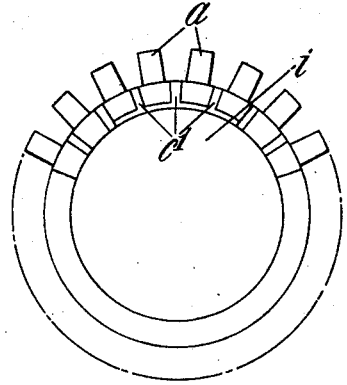

United States Patent Office  3,076,633
Patented Feb. 5, 1963

3,076,633
TURBINE AND LIKE ROTOR BLADES
Edgar Alfred Bridle, Whitley Bay, Brian William Firth, Buckland, and James Stewart Mitchell, Newcastle-upon-Tyne, England, assignors to The Parsons and Marine Engineering Turbine Research and Development Association, Wallsend, England
Filed Apr. 19, 1956, Ser. No. 579,291
Claims priority, application Great Britain June 28, 1955
5 Claims. (Cl. 253—77)

This invention relates to turbine and axial flow compressor rotor blade assemblies of the kind in which blade roots and packers between adjacent blades, all of parallelogram or other suitable non-rectangular cross-section, when viewed in the radial direction, are adapted to be radially inserted and then partially rotated so as to mate with axial serrations on the sides of a circumferential groove or grooves in the rotor.

It is the usual practice to provide a gap or "gate" in the serrations in each row for insertion of the last blade, the gate being finally closed, usually by caulking and/or welding. This introduces asymmetry into the design and may impair the strength of the rotor. It is also necessary to break the caulking or weld if it be desired to remove or replace a blade.

Such gates have previously been avoided by the use of final closing pieces in the form of split packers, of smaller axial width than that of the rotor grooves, embodying a screw or pin to hold the portions of each split packer apart and in contact with the rotor serrations. Such screws and pins have finally to be welded into place, as otherwise they are liable to work loose, and the weld has to be broken if it is necessary to remove a blade.

It is the main object of the present invention to obviate the need for such gates and caulking or welding and to remove the danger of any part working loose whilst enabling blade removal to be effected in a simple manner.

The invention consists in a method of effecting the assembly of a row of turbine or axial flow compressor rotor blades in a rotor groove furnished with circumferential serrations on the opposed sides of the groove according to which individual blade roots and one-piece packer members are inserted radially and subsequently partially rotated so that serrated ends thereon engage said circumferential serrations and at least one circumferential gap is finally filled by inserting radially the portions of at least one composite packer member, the portions of which are automatically held in place by self-locking means after having been inserted radially in the groove.

The invention also consists in a rotor having blades assembled in accordance with the method set forth in the preceding paragraph.

The invention also consists in a rotor having blades fitted to a rotor groove of uniform cross-section by radial insertion followed by partial rotation wherein a gap or gaps remaining after insertion of the last blade or one-piece packer member in a row is filled by a composite packer member or members each composed of three wedge pieces.

The invention also consists in a rotor as set forth in the preceding paragraph wherein said wedge pieces are of smaller depth than that of the groove and are thrust outwardly by a spring inserted in the groove.

The invention also consists in a rotor as set forth in the first of the two preceding paragraphs wherein said wedge pieces are of smaller axial width than that of the groove.

The invention also consists in a rotor as set forth in any of the three preceding paragraphs wherein extensions are provided on two outer wedge members for entering notches in the rotor groove walls.

The invention also consists in a turbine or axial flow compressor rotor having blades mounted in the manner described with reference to FIGURE 4, FIGURE 5 or FIGURE 6 of the accompanying drawings.

The blades and solid packers are assembled in the grooves by radial insertion followed by partial rotation, and after the insertion of the last blade or solid packer in each row a space will remain. This space may be either left as a single space and finally filled with a composite packer or divided into a number of smaller spaces finally so filled, these spaces being distributed in any desired manner round the rotor by appropriately sliding the blades and packers circumferentially in the grooves.

Referring to the accompanying diagrammatic drawings:

FIGURE 1 is a sectional view of part of a turbine or axial flow compressor rotor showing two rows of blades assembled in accordance with the present invention;

FIGURE 2 is a side elevational view of part of the blading in one row;

FIGURE 3 is a developed plan view illustrating the manner of insertion of the blades and solid packers;

FIGURES 4, 5 and 6 are diagrammatic end views of three alternative arrangements of blades;

An example of such arrangement is shown in FIGURES 1 and 2 of the accompanying diagrammatic drawings in which blades $a$ having rhomboidal roots furnished at their end faces with serrations $b$ and solid packing pieces $c$ having similar serrations at their end faces, are provided.

FIGURE 3 illustrates the manner in which the blades are inserted radially and then partially rotated, the blades $a'$ and packers $c$ being shown as already fitted in operative position with the serrated blade root ends $b$ and the serrated ends of the packers $c$ snugly engaging similar serrations $q$ in the opposed faces of a groove $e$ in the rotor $i$, and the blade $a^2$ being shown as having been inserted in the groove $e$ but not yet rotated into place.

FIGURE 4 illustrates an example embodying a single final circumferential gap $d$ left between the first and last blade applied to the groove, the blades not necessarily being equally spaced, this depending on the relative circumferential widths of blades and packers. This gap is finally filled by inserting radially a composite self-locking packer composed of three pieces embodying the present invention. Alternative forms of such composite packers are shown in FIGURES 7 and 8, FIGURE 9 and FIGURES 10 and 11 respectively.

Figure 6:
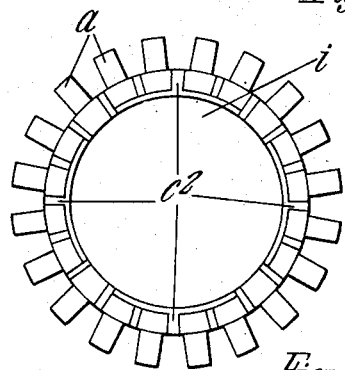

FIGURE 5 illustrates an example in which the space is equally divided and all the blades are equally spaced and the gaps $c'$ will be filled by means of self-locking composite packers to complete the assembly. In a preferred arrangement shown in FIGURE 6, the spaces are symmetrically disposed round the rotor and all the blades are equally spaced. Each space $c^2$ will be subsequently closed by a composite self-locking packer as shown in FIGURES 7 and 8 to complete the assembly.

Figure 7:
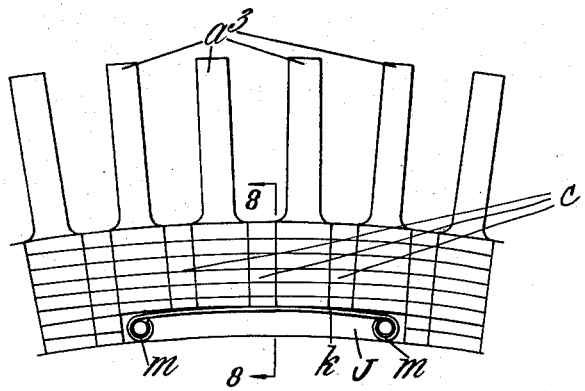
FIGURES 7 and 8 are end and sectional views respectively illustrating one form of composite packer member embodying the present invention.
Figure 8:
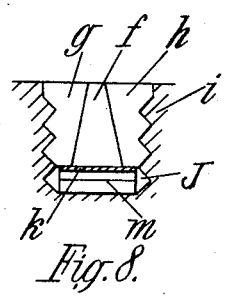

In the form shown in FIGURES 7 and 8 each of three packers $c$ comprises an inner piece $f$ in the form of a wedge which holds the serrations on two outer pieces $g$, $h$, in engagement with the serrations on the opposed face of the rotor groove. The three pieces composing each packer do not extend to the full depth of the groove, the wedging action being provided by centrifugal force on the inner pieces when the turbine is running augmented by the outward pressure exerted by a strip metal spring $k$.

The outer portions $g$, $h$ and inner portion $f$ of the composite packers and the roots of a number of adjacent blades $a^3$ extend only to the depth of the composite packers, the resuting space $j$ being occupied by the spring $k$ which is in contact with the base of the composite packers and prevents the pieces $f$ from moving radially inward when the turbine is stationary.

The spring $k$ is provided with rounded ends $m$ which allow it to slide easily in the rotor groove during assembly, and maintain it in close proximity to the base of the roots of the blades $a^3$ and composite packers to restrict its deflection due to centrifugal force when the turbine is running.

The rounded ends of the spring may be either hollow or solid or they may be hollow with pins inserted into them as shown, the use of solid ends or pins reducing the tendency of the ends to flatten under their own centrifugal load.

The spring $k$ and composite packers $g$, $f$, $h$ are such as to allow the insertion of the inner portion $f$ and its depression to the bottom of the groove against the reaction of the spring $k$ before insertion into place of the outer portions $g$, $h$.

In FIGURES 4, 5, 6 and 7, showing of the serrations at the side of the rotor groove has been omitted.

Figure 9:
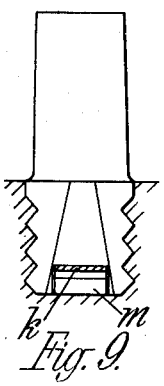
FIGURES 9 and 10 are sectional views of alternative forms of composite packer member.

In an alternative form of composite packer as shown in FIGURE 9, the outer portions of the blade roots extend to the full depth of the groove, less any working clearance but the spring $k$ ocupies a portion only of the width of the groove. The blade roots may be inserted in the groove in the manner shown in FIG. 3, and when so inserted provide room for the spring $k$.

Figure 10:
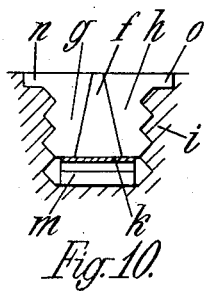
Figure 11:
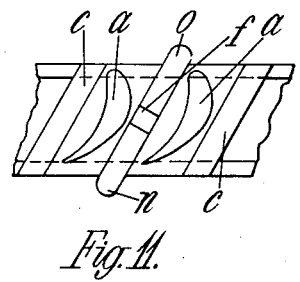
FIGURE 11 is a developed plan view illustrating the packer of FIGURE 10.

In another form of composite packer shown in FIGURES 10 and 11, the outer portions $g$, $h$ are provided with projections $n$, $o$ which extend beyond the width of the rotor groove and engage in slots in the rotor, thus preventing the blades from sliding peripherally in the groove after final assembly.

In accordance with the present invention, blade removal may be effected simply by reversing the assembly process.

We claim:

1. In a rotor having a peripheral groove extending circumferentially about the rotor and being defined by a pair of axially spaced opposed serrated faces so that a serrated blade portion may be radially inserted and partially rotated in the groove to engage its serrations in those of the serrated faces of the groove and a row of blades fitted therein, the blades of the said row having serrated portions interlocking with the said serrated faces and being dimensioned to permit placement in the groove by such radial insertion and partial rotation and having a gap too small for such blade insertion between blades in said row, after the blades have been so inserted to the number possible, means effecting closure of the said gap comprising a composite self-locking packer member composed of two outer pieces serrated on their outer faces and mating with said opposed serrated groove faces and an inner wedge piece having a radial dimension of lesser thickness than the radial depth of the rotor groove, the said inner wedge piece being disposed with its thinner end outermost and a spring in said groove directly abutting the thicker end of said wedge piece, the said two outer pieces having correspondingly slanted inner faces engaging the said wedge piece.

2. A rotor as claimed in claim 1, wherein said outer pieces composing said composite packer are of smaller depth than that of the groove and are also abutted by said spring.

3. A rotor as claimed in claim 1 wherein outer serrated pieces of said composite packer member extend radially to the full depth of said groove but the inner wedge piece thereof extends radially inwards to an extent less than said depth to accommodate said spring.

4. A rotor as claimed in claim 1 wherein the rotor has notches along the edges of the said groove and the said outer pieces have extensions fitting in the said notches.

5. A rotor as claimed in claim 1 wherein said spring engages against the said blade portions and packer members over substantially the whole of its outer surface.

References Cited in the file of this patent

UNITED STATES PATENTS

| 1,156,529 | Hillner | Oct. 12, 1915 |

FOREIGN PATENTS

| 50,233 | Sweden | Feb. 22, 1918 |
| 258,967 | Italy | June 11, 1928 |
| 659,592 | Great Britain | Oct. 24, 1951 |
| 674,543 | Great Britain | June 25, 1952 |